United States Patent

Adorno

[11] Patent Number: 5,802,828
[45] Date of Patent: Sep. 8, 1998

[54] COMPOSITE YARN FOR THE MANUFACTURING OF BRAIDED PACKINGS, BRAIDED PACKING AND PROCESS FOR FORMING THE COMPOSITE YARN

[75] Inventor: Marcello Cattaneo Adorno, Rio de Janeiro, Brazil

[73] Assignee: Manegro Administracao E Participacoes Ltda, Rio de Janeiro, Brazil

[21] Appl. No.: 676,275
[22] PCT Filed: Feb. 3, 1995
[86] PCT No.: PCT/BR95/00008
§ 371 Date: Jul. 18, 1996
§ 102(e) Date: Jul. 18, 1996
[87] PCT Pub. No.: WO95/21280
PCT Pub. Date: Aug. 10, 1995

[30] Foreign Application Priority Data

Feb. 4, 1994 [BR] Brazil ................................. 9400435

[51] Int. Cl.⁶ .................................................. D02G 3/36
[52] U.S. Cl. ......................... 57/232; 57/3; 57/6; 57/234; 87/1; 87/5; 87/13; 156/172
[58] Field of Search ............... 57/3, 6, 210, 232, 57/234; 87/1, 5, 13; 156/172

[56] References Cited

U.S. PATENT DOCUMENTS

| | | |
|---|---|---|
| 3,646,846 | 3/1972 | Houghton et al. ............................. 87/1 |
| 3,791,658 | 2/1974 | Zumeta et al. . | |
| 3,844,195 | 10/1974 | Rhodes et al. . | |
| 3,953,566 | 4/1976 | Gore ........................................ 264/288 |
| 3,962,153 | 6/1976 | Gore ....................................... 260/2.5 R |
| 4,025,598 | 5/1977 | Sasshofer et al. ........................ 264/140 |
| 4,163,825 | 8/1979 | Wimmer ....................................... 87/1 |
| 4,256,806 | 3/1981 | Snyder ..................................... 428/408 |
| 4,502,364 | 3/1985 | Zucker et al. ................................ 87/8 |
| 4,559,862 | 12/1985 | Case et al. . | |
| 5,134,030 | 7/1992 | Ueda et al. .............................. 428/365 |
| 5,240,769 | 8/1993 | Ueda et al. .............................. 428/365 |
| 5,468,327 | 11/1995 | Pawlowicz et al. ..................... 156/393 |

FOREIGN PATENT DOCUMENTS

| | | |
|---|---|---|
| A 0 152 658 | 8/1985 | European Pat. Off. . |
| A 0 282 284 | 9/1988 | European Pat. Off. . |
| A 0 358 222 | 3/1990 | European Pat. Off. . |
| 23 26 826 | 11/1973 | Germany . |
| 31 28 620 | 1/1983 | Germany . |
| 1 288 878 | 9/1972 | United Kingdom . |
| WO A94 21846 | 9/1994 | WIPO . |

OTHER PUBLICATIONS

Patent Abstracts of Japan, vol. 018 No. 380, (M–1639), 18 Jul. 1994 & JP,A, 06 101764 (Nippon Valqua Ind. Ltd) 12 Apr. 1994.

*Primary Examiner*—William Stryjewski
*Attorney, Agent, or Firm*—Beveridge, DeGrandi, Weilacher, & Young, LLP

[57] ABSTRACT

A composite yarn is for making braided packing for sealing pump or rotating valve shafts. The packing comprises an external layer and a core. Preferably, the external layer is made of expanded polytetrafluoroethylene (PTFE) impregnated with graphite, and the core is an aramide filament. The graphite impregnated, expanded PTFE gives the composite yarn good thermal conductivity, high capacity of friction reduction and good resistance to chemical attacks. The aramide filament has high mechanical strength. The composite yarn can be braided to form a packing where only the PTFE contacts the shaft, thus protecting it against uneven wear.

24 Claims, 2 Drawing Sheets

COMPOSITE YARN FOR THE MANUFACTURING OF BRAIDED PACKINGS, BRAIDED PACKING AND PROCESS FOR FORMING THE COMPOSITE YARN

The present invention refers to braided packings used for sealing pump or valve shafts, which, in turn, are used in a wide variety of industrial environments and applications.

In the manufacturing of such packings, the conventional asbestos yarns have been recently substituted for many types of synthetic yarns or filaments.

The yarns or filaments, to be appropriated for such applications, must have at least the following properties:

Good mechanical strength, in order to be easily processed at the time of their braiding and also to resist to fluid pressure and possible abrasion within the stuffing box;

Resistance to the high temperatures usually existing in process gases and fluids, as well as those generated by friction of the rotating pump or valve shaft; and Good chemical resistance.

Many high performance packings are manufactured today from polytetrafluoroethylene (PTFE)-based yarns. These yarns can be obtained by using a matrix spinning process or by cutting a "peeling" or a thin layer of material from a round sintered PTFE billet, which had its surface previously "scratched", so as to produce uniform threads or ribs thereon.

This process is described in U.S. Pat. No. 4,025,598 granted to Sasshofer et al and assigned to Chemigfaser Lenzing Aktiengesellschaft of Austria.

Another process for the manufacturing of PTFE filaments is described in U.S. Pat. No. 3,953,566 granted to Gore and in its continuation-in-part, U.S. Pat. No. 3,962,153. The yarns made by the processes of those patents are usually known as "expanded PTFE yarns" and the products resulting from those patents can still be combined with graphite, which enhances the PTFE anti-friction properties and improves its thermal conductivity.

The graphite can be added to the yarn either during the preparation of the PTFE mixture, before the extrusion step, or by coating the semi-finished yarn, as taught in U.S. Pat. No. 4,256,806 granted to Snyder.

DE-A-23 26 826 discloses a yarn in which filaments of different materials, such as of polytetrafluorethylene and aromatic polyamid, are combined providing a composite yarn. The different filaments are preferably joined without torsion. None of the filaments provides a cover or an external layer to the others. The thus formed composite yarn can itself be coated with a dispersion of particles of polytetrafluorethylene. On the one hand, a dispersion of particles does not generate a coating with uniform thickness around the composite yarn which results in variable mechanical and chemical properties along the yarn. On the other hand, it does not have a good mechanical resistance, since it does not result in a structured material as the filaments which form the composite yarn.

Similarly, EP-A-0 282 284 discloses a yarn which is composed of fibers of poly(phenylene sulfide) and of polytetrafluorethylene. This composite yarn is further impregnated with a dispersed organic material, e.g., polytetrafluorethylene or graphite, and/or an inorganic material. This also results in a coating with non-uniform properties and relative poor mechanical resistance.

PTFE yarns impregnated or coated with graphite are much superior to pure PTFE yarns, in that they can be used in the manufacturing of packings for shafts rotating with shaft surface speeds of around 25 m/s, when compared to the speeds in the range of 12 m/s of the packings made of pure PTFE.

PTFE packings are not recommended in applications where very high pressures exist in the stuffing box; in these applications the PTFE packings, specially those from expanded yarns, have been known by their characteristic of "extruding" through the gap between the shaft and the pumps housing and/or bushing.

In this case, the braiding machines have been using yarns made of aramide fiber, which are known by their great mechanical strength and resistance to high temperatures. The chemical, sealing and anti-friction properties of the aramide yarns are improved by impregnating them with PTFE dispersion.

This has been achieved, conventionally, by impregnating or coating those yarns with PTFE dispersion, in a ratio of 20% to 100% in weight of PTFE, relative to the weight of the yarn. This process has partly achieved the intended objectives but still have left margin to improvements, since the PTFE film which is formed onto the yarns throughout the impregnation process is not sufficient totally to encapsulate and protect the aramide fiber yarns.

Also, the chemical resistance of the aramide yarn is much less than that of the PTFE and its thermal transfer capability is not as good as that of, for example, the graphite impregnated PTFE.

In view of this, the manufacturers of braided packings have made another attempt of fully meeting those requisites of mechanical strength, good heat conductivity and low friction through the combination of PTFE/graphite and aramide yarns in the same packing, usually positioning the aramide yarns in the corners and edges of the braided packing—thus improving the mechanical resistance—and the PTFE/graphite in the center and sides—thus reducing the friction in the shaft and enhancing the thermal conductivity.

This type of attempt made by the prior art has achieved a reasonable success in the solution of the problem represented by the undesired "extrusion" of the PTFE, while maintaining a good thermal transfer and low friction. On the other hand, many users of the packings made by this process reported problems related to the uneven wear of the shaft, caused by the "hard" corners of the packing, which are formed by the aramide yarns.

SUMMARY OF THE INVENTION

The present invention has the objective of solving the above indicated problems of the prior art, so that no damage results for the shaft of the pump, valve or the like, with which the braided packings must be used.

This objective has been achieved in the present invention by the provision of a composite PTFE yarn having a core of a different material.

The invention also provides for a braided packing made with the said composite yarns and a process for forming the composite yarn for the manufacturing of the braided packing.

Preferably, while not essentially, the composite yarn in accordance with the present invention is made from an expanded PTFE impregnated or coated with graphite and the core is made of aramide filaments.

The invention will now be described in greater detail, with reference to the attached drawings.

DESCRIPTION OF A PREFERRED EMBODIMENT

Figure 1:
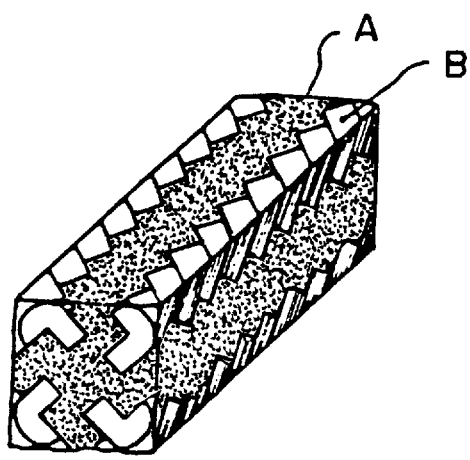
FIG. 1 is a perspective view of a braided packing in accordance with the most recent attempts of the prior art.

FIG. 1 of the drawings shows a braided packing made in accordance with the teachings of the prior art, in which the dark yarns A are expanded PTFE yarns impregnated with graphite and the clear yarns B are aramide yarns. As it can be seen, the braiding of those prior art packing is made such that the aramide yarns B form the borders of the packing, so as to provide mechanical strength thereto, while the PTFE/graphite yarns form the interior and sides of the packing, so as to provide low friction and good thermal transfer characteristics.

As above explained, such arrangement results in uneven wear in the shafts or movable parts in contact with the packing, in view of the "hard corners" formed by the aramide.

Figure 2:
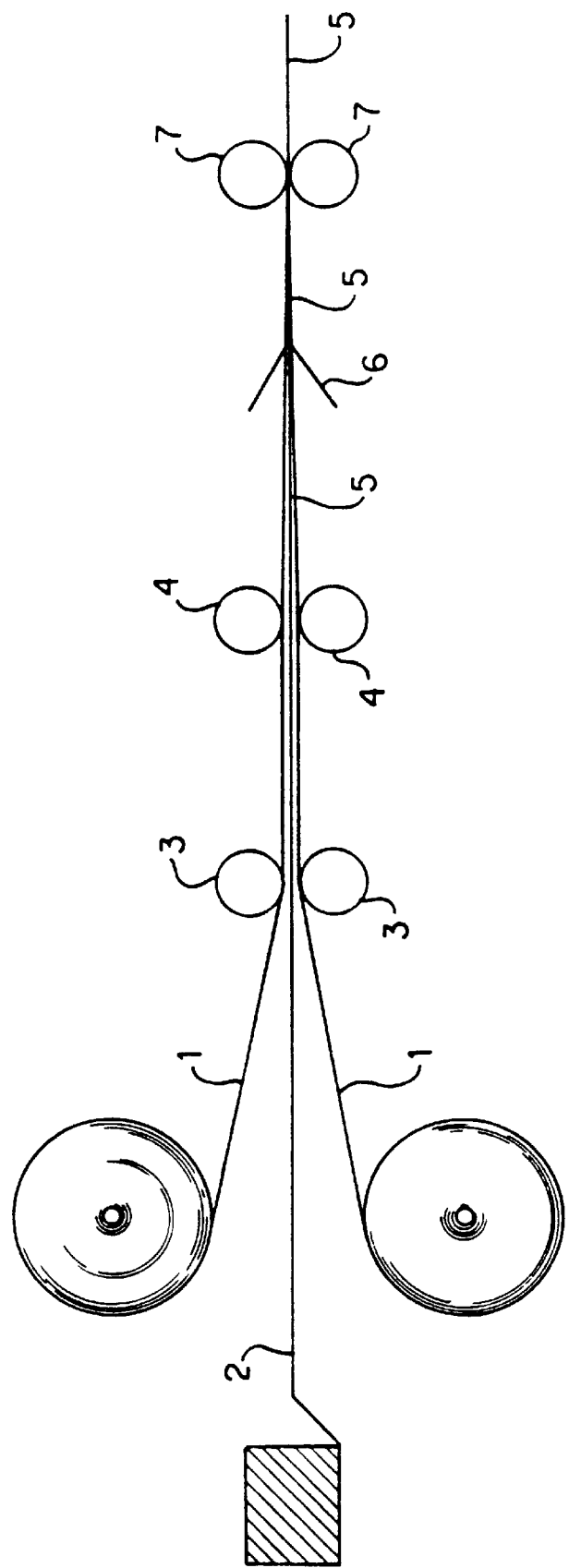
FIG. 2 is a schematic view of the manufacturing steps of the composite yarn for forming braided packings, in accordance wit the process of the invention.

Referring now to FIG. 2, the basic manufacturing steps of the composite yarn for forming braided packings in accordance with a preferred embodiment of the invention, are schematically shown.

The process of forming a composite yarn in accordance with the invention will now be described with reference to FIG. 2 of the attached drawings, in which it can be seen that two rolls of expanded PTFE single yarns 1 are unwound and combined with a core filament of aramide yarn 2, when passing through a first pair of guide rolls 3. The composite yarn is then passed through a pair of pressure rolls 4 in order to eliminate any air trapped between the single yarns 1 and completely to seal the aramide filament 2 between the said yarns 1. The thus formed composite yarn 5 is then fed to a nozzle 6, which folds the composite yarn 5 onto itself, after which the composite yarn 5 is passed through a second pair of pressure rolls 7.

The preferred weight of the core filament 2 to be used in the process of the invention is in the range of 75 to 500 tex (1,200 tex=1.2 g/m of yarn), while the preferred combined weight of the two single PTFE yarns 1 is in the range of 500 to 3,500 tex, that is to say, if a single PTFE yarn 1 is used, its weight should be between 500 and 3,500 tex and if two single yarns 1 are used, their individual weights should be between 250 and 1,750 tex. In this manner, the weight of the composite yarn formed in accordance with the invention will be, preferably, between 575 and 4,000 tex.

Also, the single yarn or yarns 1 to be used as an outer layer of the composite yarn 5 can be made of PTFE resin, pure or in combination with other fillers such as graphite, mica or any other organic or inorganic filler.

These yarns are made by a process usually known as "paste extrusion process", which involves the extrusion of a preformed billet of PTFE mixed with an appropriate percentage of liquid lubricant, which will act as an extrusion aid. The extrudate is then passed through a calendering roll, where it is pressed until the desired thickness assuming the shape of a yarn. The yarn is, in turn, dried in order to eliminate the extrusion aid and then stretched and sintered.

For the purposes of the invention, a preferred yarn is that produced in accordance with the teachings of U.S. Pat. No. 3,962,153.

The inner surface of the single PTFE yarns 1 can be ¢coated, if desired, either with adhesive or with a sealing compound which can, itself, be based on PTFE dispersion, which has the further property of providing a better adherence between the two single yarn layers 1, when submitted to pressure conditions.

The said pressure rolls 4 and 7 can be also heated, if desired, to a temperature range of 120° C. to 270° C. and, preferably, 200° C. to 270° C.

Figure 3:
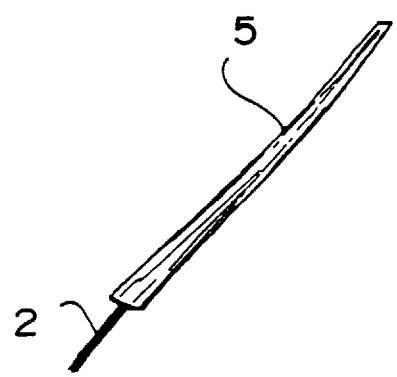
FIG. 3 is an enlarged view of the composite yarn in accordance with the invention.

FIG. 3 shows a composite yarn 5 made in accordance with the invention, where the aramide filament 2 can be seen laminated between the two single expanded PFTE yarns 1 which, in a preferred embodiment of the invention, are impregnated with graphite.

The composite yarn 5 in accordance with this preferred embodiment of the invention, have all the low friction, good thermal conductivity and good chemical resistance properties of the PTFE which will contact the rotating shaft (not shown), while still maintaining the mechanical properties of the core material, in this case the aramide filament 2, which does not directly contact the shaft to be sealed, therefore not causing any damage thereto.

Figure 4:
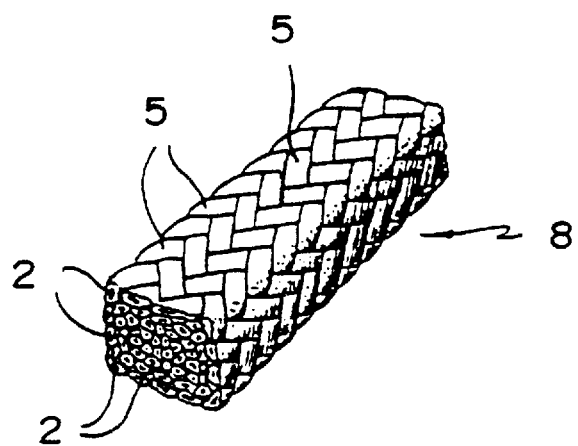
FIG. 4 is a perspective view of a braided packing made with the composite yarn in accordance with the invention.

FIG. 4 shows a section of a braided packing 8 made with a composite yarn 5 in accordance with the teachings of the present invention, where it can be seen that the entire external surface of the packing is made from the composite yarns 5 which, in turn, are formed, as above explained, from single expanded PTFE yarns 1 impregnated with graphite, including its edges, since the aramide filaments 2, which provide mechanical strength to the braided packing 8, are encapsulated within the composite yarns 5.

While a preferred embodiment of the invention has been described and illustrated being-formed by two expanded and graphite impregnated PTFE yarns, having an core filament made of aramide, it should be understood that the basic concept of the invention can be embodied in several other manners, without departing from the basic inventive idea, namely, provide a composite- yarn and a packing made therewith, such that the yarn sums up the low friction, good thermal conductivity and chemical resistance properties in its external surface, and the mechanical strength or other properties provided by a core made of a different material.

Accordingly, the inventive idea for which protection is sought embraces composite yarns made of PTFE, expanded or not, formed by laminating two or more single PTFE yarns with one or more core filaments made, for example, of glass, carbon, graphite, acrylic or other materials which can be braided for forming the packing, including graphite yarns and metallic wires, the choice depending on the environment in which the packing must be used, as well as on the technical requirements considered for each individual application.

The present invention, therefore, should be limited only for the attached claims.

I claim:

1. Composite yarn (5) for forming braided packings (8), comprising an outermost layer which is a laminated yarn made of a first material (1) and a core made of a second material (2), said core including a filament.

2. Composite yarn in accordance with claim 1, characterized in that the first material (1) is polytetrafluoroethylene (PTFE).

3. Composite yarn in accordance with claim 2, characterized in that the polytetrafluoroethylene is an expanded polytetrafluoroethylene.

4. Composite yarn in accordance with claim 3, characterized in that the expanded polytetrafluoroethylene is impregnated or coated with graphite.

5. Composite yarn in accordance to claim 2, wherein the second material (2) which forms the core, has a mechanical strength greater than the said first material (1).

6. Composite yarn in accordance with claim 2, wherein the polytetrafluoroethylene is an expanded polytetrafluoroethylene.

7. Composite yarn in accordance with claim 6, wherein the second material (2) which forms the core, has a mechanical strength greater than the said first material (1).

8. Composite yarn in accordance with claim 2, wherein the said second material (2) is aramide.

9. Braided packing (8) formed by a plurality of the composite yarns (5) defined in claim 2.

10. Composite yarn in accordance with claim 2, wherein said laminated yarn includes at least two single yarns (1) of the said first material which are laminated together.

11. Composite yarn in accordance with claim 1, characterized in that the second material (2) which forms the core, has a mechanical strength greater than the said first material (1).

12. Braided packing (8) formed by a plurality of the composite yarns (5) defined in claim 11.

13. Composite yarn in accordance with claim 1, characterized in that the said second material (2) is aramide.

14. Braided packing (8) formed by a plurality of the composite yarns (5) defined in claim 1.

15. Composite yarn in accordance with claim 1, wherein said laminated yarn includes at least two single yarns (1) of the said first material which are laminated together.

16. Composite yarn in accordance with claim 15, characterized in that at least one of the said single yarns (1) is provided with adhesive on its face which contacts the said second material (2).

17. Process for forming a composite yarn for forming braided packings, comprising an external layer made of a first material and a core made of a second material, comprising the steps of:

(a) forming a laminate which includes at least one single yarn of said first material and at least one filament of said second material;

(b) pressing the laminate formed in step (a);

(c) folding the said at least one single yarn onto the said filament of the second material to form a final laminate; and (d) pressing the laminate formed in step (c).

18. Process in accordance with claim 17, characterized in that the said step (a) is carried out by using two of the said single yarns, one at each side of the said second material filament.

19. Process in accordance with claim 17, characterized in that at least one of the said pressing steps is carried out by heated pressing rolls, at a temperature in the range of 120° C. to 270° C.

20. Process in accordance with claim 19, characterized in that the said temperature is in the range of 200° C. to 270° C.

21. Composite yarn for forming braided packings, comprising a laminated yarn and a core, said laminated yarn being made of polytetrafluoroethylene, said core including a filament of a material which is different from polytetrafluoroethylene, said laminated yarn surrounding said core.

22. Composite yarn in accordance with claim 21, wherein said polytetrafluoroethylene is expanded polytetrafluoroethylene.

23. Composite yarn in accordance with claim 22, wherein said expanded polytetrafluoroethylene is impregnated with graphite or coated with graphite.

24. Composite yarn in accordance with claim 23, wherein said filament is an aramid filament.

* * * * *